(12) United States Patent
Belter

(10) Patent No.: US 6,283,690 B1
(45) Date of Patent: *Sep. 4, 2001

(54) ELECTRICAL BOX LOCATING DEVICE

(76) Inventor: Randall S. Belter, 1170 Cottage Grove, GreenBay, WI (US) 54313

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/292,221

(22) Filed: Apr. 16, 1999

(51) Int. Cl.[7] .................................................. F16B 37/00
(52) U.S. Cl. .............................. 411/107; 174/63; 174/50; 174/58; 220/4.02; 411/480
(58) Field of Search .................................. 174/58, 53, 48, 174/50, 57, 63; 248/906; 411/107, 480; 220/4.02, 3.8; 33/528, DIG. 10

(56) References Cited

U.S. PATENT DOCUMENTS

| | | | |
|---|---|---|---|
| 2,987,909 | * | 6/1961 | Shlank ..................................... 70/168 |
| 4,616,104 | * | 10/1986 | Lindsey ................................... 174/48 |
| 4,626,617 | * | 12/1986 | Rye ........................................ 174/53 |
| 4,667,840 | * | 5/1987 | Lindsey ................................. 220/3.2 |
| 4,693,653 | * | 9/1987 | Schubert et al. ...................... 411/107 |
| 4,898,357 | * | 2/1990 | Jorgensen et al. ................... 52/220.1 |
| 4,986,709 | * | 1/1991 | Hachtel et al. ......................... 411/30 |
| 5,413,441 | * | 5/1995 | Heminger et al. ...................... 411/55 |
| 5,574,256 | * | 11/1996 | Cottone ................................... 174/53 |
| 5,588,788 | * | 12/1996 | DomimGuez ......................... 411/482 |
| 5,596,174 | * | 1/1997 | Sapienza ................................. 174/57 |
| 5,728,971 | * | 3/1998 | Nash .................................. 174/50.52 |
| 5,728,973 | * | 3/1998 | Jorgensen ........................... 174/65 R |
| 5,845,412 | * | 12/1998 | Arcand ................................... 33/758 |
| 6,024,600 | * | 2/2000 | Daoud et al. ...................... 439/540.1 |

* cited by examiner

Primary Examiner—Dean A. Reichard
Assistant Examiner—Dhiru R Patel
(74) Attorney, Agent, or Firm—Joseph S. Heino, Esq.

(57) ABSTRACT

An electrical box locating device is formed from a single piece of metallic material. The locating device has a forwardly extending fastening portion which is functionally adapted to be received within a threaded receptacle mounting hole of a typical electrical box. Rearwardly of the fastening portion is a drive portion which allows the device to be driven into the mounting hole and securely held within it. Rearwardly of the drive portion of the device is a drywall penetrating portion which extends outwardly of the electrical box and which is functionally adapted to penetrate and extend through a sheet of drywall when such is placed over the electrical box. The fastening portion, the drive portion and the penetrating portion of the device are made from a single piece of material and integrally formed in the preferred embodiment of the invention.

1 Claim, 1 Drawing Sheet

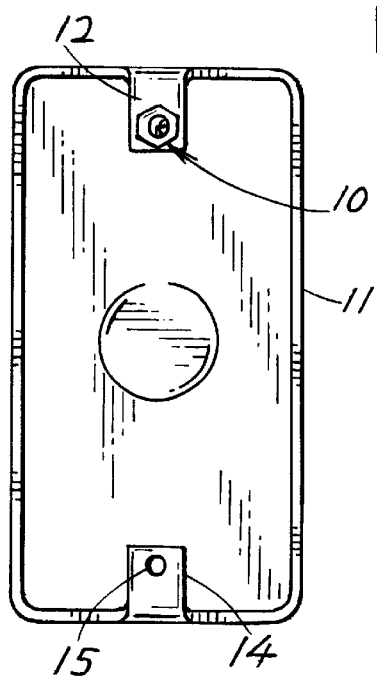
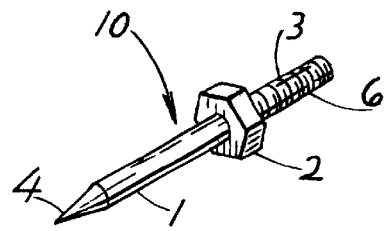
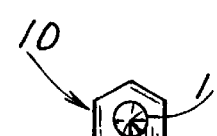
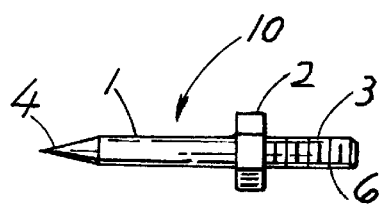
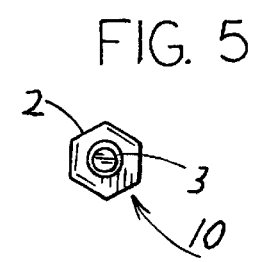
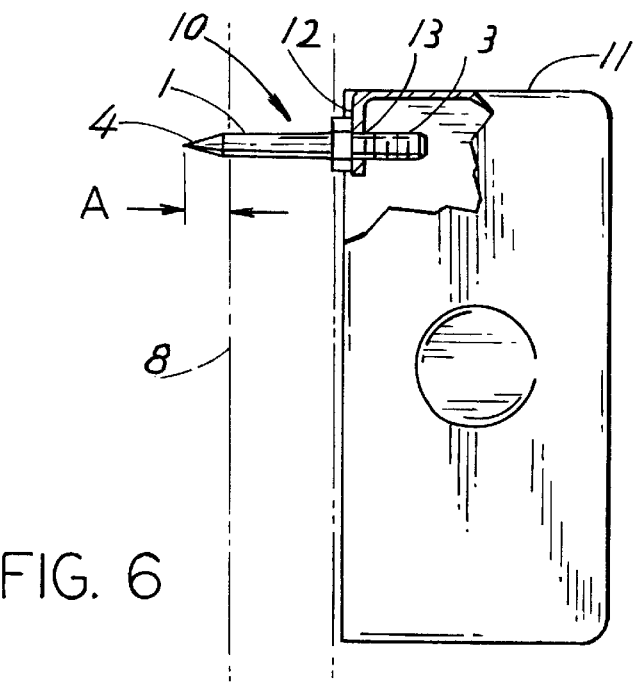

ELECTRICAL BOX LOCATING DEVICE

FIELD OF THE INVENTION

This invention relates generally to items used by tradespeople, and, particularly, professional drywall and electricians, in the building construction trades. More specifically, it relates to a device which is used to mark and locate electrical boxes which are mounted within walls prior to sheets of drywall being applied over such boxes during the building construction process.

BACKGROUND OF THE INVENTION

It has long been recognized that the construction of buildings and the like require that many of the basic utilities supplied throughout the building be contained within walls of the building. Such is done for aesthetic purposes as well as for functional reasons. It is imperative for the electrician and the plumber, as well as other tradespeople, to run and mount wires, fixtures, conduits and plumbing through the walls of a building while those walls are still in their rough stages of construction. Once these various wires, fixtures and other items of such utility construction have been mounted and installed, a safety inspection of them can be made. After the safety inspection has cleared the way for covering the walls and sealing their contents, the drywallers can attend to the task of finishing the walls by attaching the drywall panels to the wall studs.

One problem which is inherent to this process is that, with the drywall attached and in place, it is then necessary to uncover electrical fixtures previously mounted within the walls so that the electrical finish work can be accomplished. In the experience of this inventor, conventional measures which are taken to mark the location of such buried electrical fixtures, such as marking the floor at or just below fixture, often result in fixtures being located slightly off from where they actually are mounted. That is, an electrical receptacle box which is thought to exist in one location, when uncovered, often ends up being slightly off from where it was expected to be. Without precise locating of such electrical receptacle boxes, extensive additional drywall work can result where holes or gaps must be patched adjacent the electrical box and, in extreme cases, whole sections of drywall must be extensively repaired.

SUMMARY OF THE INVENTION

It is, therefore, a principal object of this invention to provide a new, useful and uncomplicated device for accurately locating an electrical receptacle box which has been mounted within a wall over which drywall has been applied. It is a further object of this invention to provide such a device which requires only a minimal number of elements and which requires only a minimal number of steps to utilize. It is yet another object of this invention to provide such a device which can be readily used by professional electricians and drywallers in-the field. It is still another object of this invention to provide such a device which is readily and quickly usable with existing to electrical boxes which are commercially available and used in the field. It is still another object of this invention to provide such a device which may be used and reused over and over again.

The present invention has obtained these objects. It provides for an electrical box locating device which is formed, in the preferred embodiment, from a single piece of metallic material. The locating device has a forwardly extending fastening portion which is functionally adapted to be received within a threaded receptacle mounting hole of a typical electrical box. Rearwardly of the fastening portion is a drive portion which allows the device to be driven into the mounting hole and securely held within it. Rearwardly of the drive portion of the device is a drywall penetrating portion which extends outwardly of the electrical box and which is functionally adapted to penetrate and extend through a sheet of drywall when such is placed over the electrical box. The fastening portion, the drive portion and the penetrating portion of the device are made from a single piece of material and integrally formed in the preferred embodiment of the invention. The foregoing and other features of the device of the present invention will be further apparent from the description which follows.

BRIEF DESCRIPTION OF THE DRAWINGS

FIG. 1 is a front elevational view of a typical electrical box and showing a device constructed in accordance with the present invention as it is mounted in the top mounting hole of the box.

FIG. 2 is an enlarged front perspective view of the locating device of the present invention.

FIG. 3 is a front elevational view of the locating device shown in FIG. 2.

FIG. 4 is a right side elevational view of the locating device shown in FIGS. 2 and 3.

FIG. 5 is a rear elevational view of the device shown in FIGS. 2, 3 and 4.

FIG. 6 is a right side elevational view of the electrical box and locating device shown in FIG. 1 and showing a portion of the locating device piercing a sheet of drywall placed over the electrical box.

DETAILED DESCRIPTION

Referring now to the drawings in detail, FIG. 1 shows a typical electrical box 11. The electrical box 11 has a plurality of mounting flanges 12, 14 situated in its outwardly facing opening. Defined within each of the mounting flanges 12, 14 is a threaded mounting hole 13, 15, respectively. As shown in FIG. 1, the top mounting flange 12 of the box 11 has a locating device of the present invention inserted within it. The locating device, generally identified 10, is constructed of a single piece of metal in the preferred embodiment.

The locating device 10 of the present invention includes a forwardly extending portion 1, a central portion 2, and a rearwardly extending portion 3. See FIG. 2. The forwardly extending portion 1 of the locating device 10 includes a drywall piercing portion 4 which is functionally adapted to pierce a sheet of drywall which may be placed over the box 11. Rearwardly of the piercing portion 4 of the locating device 10 is a central drive portion 2. This central drive portion 2, in the preferred embodiment, is formed in the shape of a hexagonal drive nut. In this fashion, the central drive portion 2 can be used to power drive the locating device 10 into the mounting flange 12 of the box 11. Further rearwardly of the central drive portion 2 of the locating device 10 is a rearwardly extending fastening portion 3. The fastening portion 3 of the locating device 10 includes a threaded portion 6 which is functionally adapted to be received within the threaded hole 13 of the top mounting flange 12. It could also be received within the threaded hole 15 of the bottom flange 14 of the electrical box 11.

In application, the user takes one of the locating devices 10 constructed in accordance with the present invention and inserts the threaded fastening portion 3 of it into the threaded hole 13 of the electrical box mounting flange 12. A drive device (not shown) is then placed by the user over the central drive portion 2 of the locating device 10. The drive device is then activated and the locating device 10 is driven into the hole 13 of the mounting flange 12 sufficiently that the shoulder of the hexagonal central portion 2 is secured against the mounting flange 12 of the box 11. In this fashion, the locating device 10 is unable to work loose from the mounting flange 12. With the locating device 10 secured as such, the drywall piercing portion 1 of the device 10 extends outwardly of the box 11 in a generally perpendicular relation to the wall within which the box 11 is located. A sheet of drywall 8 is then urged over the piercing end 4 of the locating device and secured into place with drywall fasteners (also not shown). In the preferred embodiment, the drywall piercing end 4 of the locating device 10 extends through the mounted drywall sheet 8 such that it can be readily and accurately located. This also serves to accurately locate the box 11 into which the locating device 10 was originally located. A section of the drywall 8 is then cut away sufficiently to accurately expose the frontal profile of the electrical box 11. The locating device 10 can then be withdrawn from the mounting flange 12 of the box 11 and reused as such is desired or required.

From the foregoing detailed description of the illustrative embodiment of the invention set forth herein, it will be apparent that there has been provided a new, useful and uncomplicated device for accurately locating an electrical receptacle box which has been mounted within a wall over which drywall has been applied; which requires only a minimal number of elements and which requires only a minimal number of steps to utilize; which can be readily used by professional electricians and drywallers in the field; which is readily and quickly usable with existing electrical boxes which are commercially available and used in the field; and which may be used and reused over and over again.

The principles of this invention having been fully explained in connection with the foregoing, I hereby claim as my invention:

1. A locating device for use with an electrical box, said electrical box being mountable within a wall or ceiling and including at least one mounting flange, said mounting flange including at least one threaded hole facing outwardly of the wall or ceiling for receiving a box cover fastener therewithin, said locating device comprising a longitudinally extending device body, said device body including a first end having means for fastening said device body to said at least one threaded hole of the electrical box, said fastening means being located at the first end of said device body and including a threaded portion which is threadably receivable within said at least one threaded hole of the mounting flange of the electrical box; a second end having means for piercing and penetrating a piece of drywall placed over said electrical box, said drywall piercing means including a pointed cylindrical member for piercing and penetrating through said piece of drywall; and a central drive portion interposed between said pointed cylindrical member and said threaded portion of the device body, said drive portion being formed in the shape of a hexagonal nut and said drive portion being secured against a mounting flange of the electrical box when the first end of the locating device is threadably received within said at least one threaded hole of the mounting flange to limit the threadable advancement of the threaded portion of the first end of the device body within the threaded hole of the mounting flange, said device body first end, said central drive portion and said device body second end being formed from a single piece of metal material.

* * * * *